US008179928B2

(12) United States Patent
Wang

(10) Patent No.: US 8,179,928 B2
(45) Date of Patent: May 15, 2012

(54) PASSIVE COHERENT ARRAY USING DISTRIBUTED FIBER LASERS

(75) Inventor: Baishi Wang, Princeton, NJ (US)

(73) Assignee: Vytran, LLC, Morganville, NJ (US)

( * ) Notice: Subject to any disclaimer, the term of this patent is extended or adjusted under 35 U.S.C. 154(b) by 58 days.

(21) Appl. No.: 12/830,629

(22) Filed: Jul. 6, 2010

(65) Prior Publication Data
US 2011/0158266 A1 Jun. 30, 2011

Related U.S. Application Data

(60) Provisional application No. 61/223,210, filed on Jul. 6, 2009.

(51) Int. Cl.
*H01S 3/30* (2006.01)
*H01S 3/09* (2006.01)
*H01S 3/08* (2006.01)
(52) U.S. Cl. ............... 372/6; 372/69; 372/92; 372/102
(58) Field of Classification Search .............. 372/6, 69, 372/92, 108
See application file for complete search history.

(56) References Cited

U.S. PATENT DOCUMENTS

| 5,313,477 | A | | 5/1994 | Esterowitz et al. | |
|---|---|---|---|---|---|
| 5,621,749 | A | * | 4/1997 | Baney | 372/69 |
| 5,930,029 | A | * | 7/1999 | Mehuys | 359/341.33 |
| 6,212,310 | B1 | * | 4/2001 | Waarts et al. | 385/24 |
| 6,275,632 | B1 | * | 8/2001 | Waarts et al. | 385/37 |
| 6,721,088 | B2 | * | 4/2004 | Brar et al. | 359/334 |
| 7,054,339 | B1 | | 5/2006 | Hu et al. | |
| 2005/0238065 | A1 | | 10/2005 | Shirakawa et al. | |
| 2006/0171426 | A1 | | 8/2006 | Starodoumov et al. | |

OTHER PUBLICATIONS

International Search Report and Written Opinion for International Patent Application No. PCT/US10/41024, mailed on Feb. 25, 2011.
Y. Jeong et al., "Ytterbium-doped large-core fiber laser with 1.36 kW continuous-wave output power," Optics Express, vol. 12, 6088, 5 pgs., 2004.
V. Kozlov et al., "All-fiber coherent beam combining of fiber lasers," Optics Letters, vol. 24, No. 24, pp. 1814-1816, Dec. 15, 1999.
H. Bruesselbach et al., "Self-organized coherence in fiber laser arrays," Optics Letters, vol. 30, No. 11, pp. 1339-1341, Jun. 1, 2005.

(Continued)

*Primary Examiner* — Jessica Stultz
*Assistant Examiner* — Phillip Nguyen
(74) *Attorney, Agent, or Firm* — Cooley LLP

(57) ABSTRACT

In some embodiments, an apparatus includes a first laser cavity including a set of high-reflector gratings coupled in series and a second laser cavity including a set of high-reflector gratings coupled in series. Each high-reflector grating has an associated spectral bandwidth. The first laser cavity is configured to receive at a first end optical energy having a first spectral bandwidth and the second laser cavity is configured to receive at a first end optical energy having a second spectral bandwidth. A fiber coupler is coupled to a second end of the first laser cavity and to a second end of the second laser cavity. The fiber coupler is configured to receive optical energy from the first laser cavity having a third spectral bandwidth greater than the first spectral bandwidth, and receive optical energy from the second laser cavity having a fourth spectral bandwidth greater than the second spectral bandwidth.

4 Claims, 6 Drawing Sheets

OTHER PUBLICATIONS

B. Wang et al., "All-fiber 50 W coherently combined passive laser array," Optics Letters, vol. 34, No. 7, pp. 863-865, Apr. 1, 2009.

H. Bruesselbach et al., "200 W self-organized coherent fiber arrays," Conference on Lasers and Electro-Optics (CLEO), vol. 1, 532, 3 pgs., 2005.

T. Loftus et al., "Four-Channel, High Power, Passively Phase Locked Fiber Array," Optical Society of America, 3 pgs., 2008.

T. Loftus et al., "Four-channel, high power, passively phase locked fiber array," SSDLTR, 16 pgs., 2007.

A. Shirakawa et al., "Coherent addition of fiber lasers by use of a fiber coupler," Optics Express, vol. 10, No. 21, pp. 1167-1172, Oct. 21, 2002.

D. Kouznetsov et al., "Limits of coherent addition of lasers: simple estimate," Opt. Review, vol. 12, 445-447, 2005.

* cited by examiner

PASSIVE COHERENT ARRAY USING DISTRIBUTED FIBER LASERS

CROSS REFERENCE TO RELATED APPLICATIONS

This application claims priority to and the benefit of U.S. Provisional Patent Application Ser. No. 61/223,210, entitled "Passive Coherent Array Using Distributed Fiber Lasers," filed Jul. 6, 2009, the disclosure of which is incorporated herein by reference in its entirety.

BACKGROUND

Known continuous wave (CW) fiber lasers are used in industrial applications such as marking, medal cutting, welding, and the like. CW fiber lasers are suitable for industrial applications because of their high wall-plug efficiency and output beam quality. Additionally, a single strand of a CW fiber laser can output power in the kilo-Watt level.

The power and brightness of CW fiber lasers can be scaled by combining multiple CW fiber lasers via coherent arrays. Specifically, the power output can be increased by combining the output of multiple CW fiber lasers coherently. To produce a coherent array, the multiple coherent lasers are added in-phase. This can be accomplished using either active phase control or passive phasing.

Passive phasing combines multiple CW fiber lasers using spontaneous phase locking. The coherent coupling efficiency of a passive coherent array produced by combining multiple CW fiber lasers depends on the spectral bandwidth of each laser to be combined. Lasers having large spectral bandwidths can be more effectively combined than lasers having respectively smaller spectral bandwidths. Accordingly, a need exists for a passive coherent array having multiple fiber lasers with increased spectral bandwidths.

SUMMARY

In some embodiments, a passive coherent array includes multiple laser cavities coupled together by a fiber coupler. Each laser cavity includes multiple high-reflector gratings coupled in series and a doped fiber. The multiple high-reflector gratings increase the spectral bandwidth of optical energy in each laser cavity, and the doped fiber amplifies the intensity of the optical energy in each laser cavity. For example, each laser cavity can be configured to receive from an energy source optical energy having a first spectral bandwidth and pass to a fiber coupler the optical energy having a second spectral bandwidth greater than the first spectral bandwidth.

DETAILED DESCRIPTION

Apparatuses and methods are described herein for providing a laser cavity system. In some embodiments, an apparatus includes a first laser cavity including a set of high-reflector gratings coupled in series. Each high-reflector grating from the set of high-reflector gratings has an associated spectral bandwidth. The first laser cavity has a first end and a second end, and the first end of the first laser cavity is configured to receive optical energy having a first spectral bandwidth. A second laser cavity includes a set of high-reflector gratings coupled in series, and each high-reflector grating from the set of high-reflector gratings has an associated spectral bandwidth. The second laser cavity has a first end and a second end, and the first end of the second laser cavity is configured to receive optical energy having a second spectral bandwidth. A fiber coupler is coupled to the second end of the first laser cavity and coupled to the second end of the second laser cavity. The fiber coupler is configured to receive optical energy from the first laser cavity having a third spectral bandwidth greater than the first spectral bandwidth, and receive optical energy from the second laser cavity having a fourth spectral bandwidth greater than the second spectral bandwidth.

Figure 1:
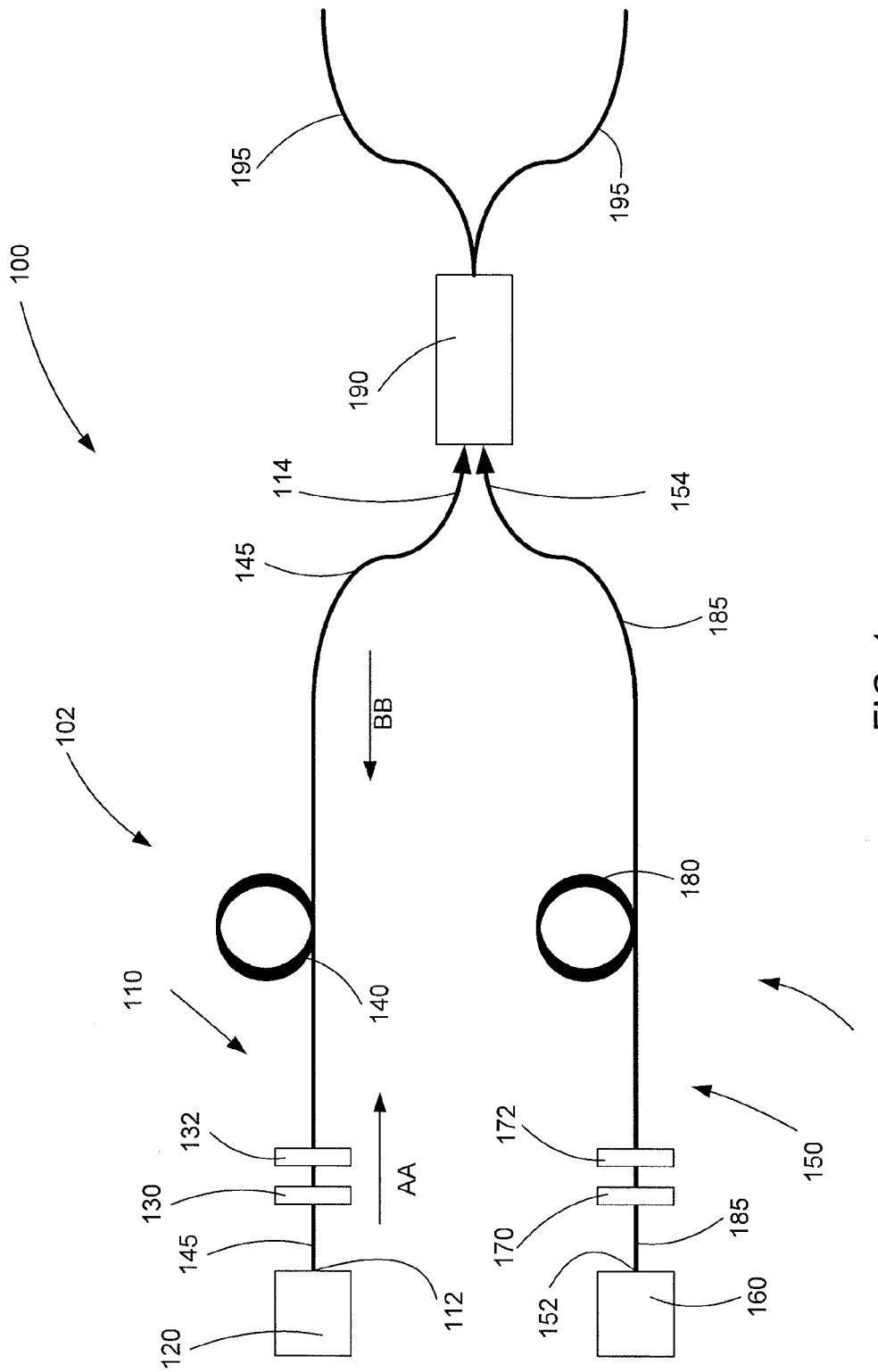
FIG. 1 is a schematic illustration of a passive coherent array, according to an embodiment.

FIG. 1 is a schematic illustration of a passive coherent array 100, according to an embodiment. The passive coherent array 100 includes a first laser cavity system 102, a second laser cavity system 104, a fiber coupler 190 and output fibers 195. The first laser cavity system 102 includes a pump 120 and a first laser resonance cavity 110 (also referred to herein as "first laser cavity") defined between a first end 112 and a second end 114 as shown in FIG. 1. The first laser cavity 110 includes a first high-reflector grating 130, a second high-reflector grating 132, doped fiber 140 and undoped fiber 145. As shown in FIG. 1, the pump 120, the first high-reflector grating 130, the second high-reflector grating 132, and the doped fiber 140 are coupled together in series. In some embodiments, undoped fiber 145 can be used to couple the elements of the first laser cavity 110 together. The undoped fiber 145 can be any suitable undoped passive fiber.

The second laser cavity system 104 is substantially similar to the first laser cavity system 102. Specifically, the second laser cavity system 104 includes a pump 160 and a second laser resonance cavity 150 (also referred to herein as "second laser cavity") defined between a first end 152 and a second end 154 as shown in FIG. 1. The second laser cavity 150 includes a first high-reflector grating 170, a second high-reflector grating 172, doped fiber 180 and undoped fiber 185 all of which are substantially similar to the pump 120, the first high-reflector grating 130, the second high-reflector grating 132, the doped fiber 140 and the undoped fiber 145, respectively of the first laser cavity system 102.

The pump 120 of the first laser cavity system 102 can be any optical energy source configured to transfer or generate optical energy from an outside location into the first laser cavity system 102. In some embodiments, for example, the pump 120 can include light emitting diodes, semiconductor laser diodes, other lasers and/or the like. In some embodiments, the optical energy from the pump 120 can be energy of various wavelengths from a visual portion of the electromagnetic spectrum.

As discussed above, the first high-reflector grating 130 is coupled to the pump 120 via undoped fiber 145 and is placed in series with the second high-reflector grating 132. The first high-reflector grating 130 can be any grating configured to reflect a high percentage of optical energy around a center wavelength $\lambda_A$ (see FIG. 2) received in a first direction (arrow BB in FIG. 1), but allow optical energy received in a second direction (arrow AA in FIG. 1) to be transmitted. In some embodiments, for example, the first high-reflector grating 130 can reflect more than 99% of the optical energy at the center wavelength $\lambda_A$ when received in the first direction.

Figure 2:
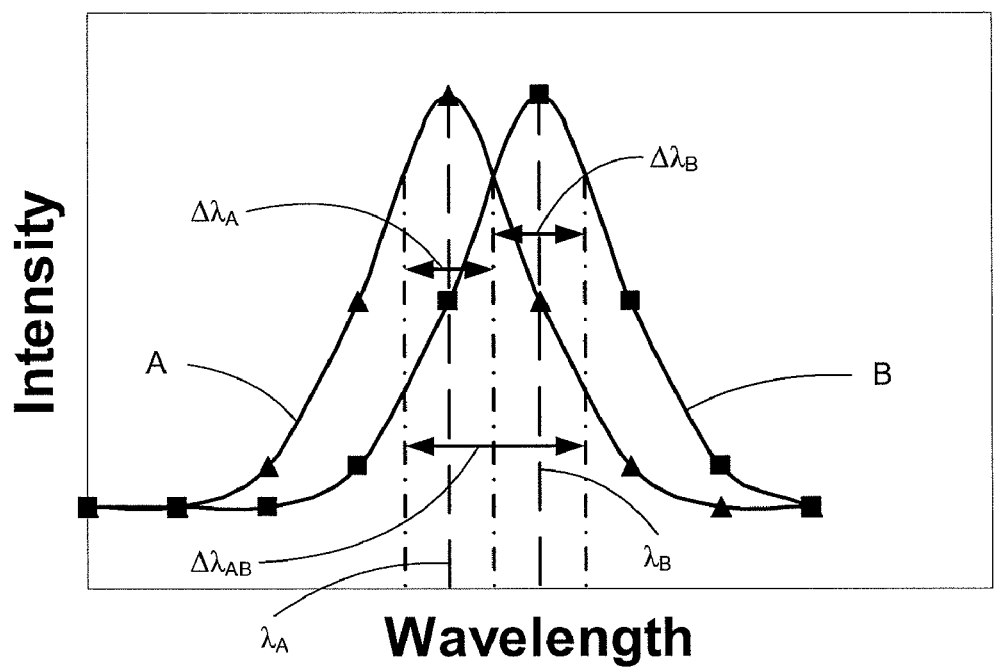
FIGS. 2-3 are plots showing the intensity as a function of wavelength of optical energy passed through various high-reflector gratings.

The second high-reflector grating 132 can be similar to the first high-reflector grating 130. The center wavelength $\lambda_B$ of optical energy reflected by the second high-reflector grating 132, however, differs from the center wavelength $\lambda_A$ of optical energy reflected by the first high-reflector grating 130. For example, FIG. 2 is a plot showing the spectral response of the first high-reflector grating 130 (for optical energy A) and the spectral response of the second high-reflector grating (for optical energy B). The spectra of optical energy A and B are centered around the center wavelengths $\lambda_A$ and $\lambda_B$, respectively.

The spectral bandwidths $\Delta\lambda_A$ and $\Delta\lambda_B$ of each high-reflector grating 130, 132 can be, for example, a few nanometers centered around the center wavelengths $\lambda_A$ and $\lambda_B$, respectively. In some embodiments, for example, the spectral bandwidths $\Delta\lambda_A$ and $\Delta\lambda_B$ of the high-reflector gratings 130, 132 can be between 0.4 nm to 5.0 nm. In other embodiments, the spectral bandwidths can be greater than 5.0 nm. In still other embodiments, the spectral bandwidths can be less than 0.4 nm. In some embodiments, the spectral bandwidth of a high-reflector grating can be the 3 dB bandwidth of the high-reflector grating.

Coupling the first high-reflector grating 130 in series with the second high-reflector grating 132 increases the spectral bandwidth $\Delta\lambda_{AB}$ of the first laser cavity 110, as described in further detail herein. The spectral bandwidth $\Delta\lambda_{AB}$ of the first laser cavity 110 can include the spectral bandwidth $\Delta\lambda_A$ of the first high-reflector grating 130 and the spectral bandwidth $\Delta\lambda_B$ of the second high-reflector grating 132. Said another way, the spectral bandwidth $\Delta\lambda_{AB}$ of the first laser cavity 110 is the aggregation of the spectral bandwidth $\Delta\lambda_A$ and the spectral bandwidth $\Delta\lambda_B$.

As shown in FIG. 2, for example, in some embodiments the spectral bandwidth $\Delta\lambda_A$ of the first high-reflector grating 130 can be substantially equal to the spectral bandwidth $\Delta\lambda_B$ of the second high-reflector grating 132, and the spectrum defined by the spectral bandwidth $\Delta\lambda_A$ of the first high-reflector grating 130 does not overlap with the spectrum defined by the spectral bandwidth $\Delta\lambda_B$ of the second high-reflector grating 132. In such embodiments, the spectral bandwidth $\Delta\lambda_{AB}$ of the first laser cavity 110 can be represented by:

$$k=n*\Delta\lambda,$$

where k is the spectral bandwidth of the first laser cavity 110, n is the number of high-reflector gratings in the first laser cavity (e.g., 2 in laser cavity 110) and $\Delta\lambda$ is the spectral bandwidth of each high-reflector grating 130, 132. This formula demonstrates that as the number of high-reflector gratings coupled together in serial increases, the spectral bandwidth $\Delta\lambda_{AB}$ of the first laser cavity 110 increases. Increasing the spectral bandwidth of each laser cavity 110, 150 increases the coherent beam combining efficiency of the fiber coupler 190, as described in further detail herein.

Figure 3:
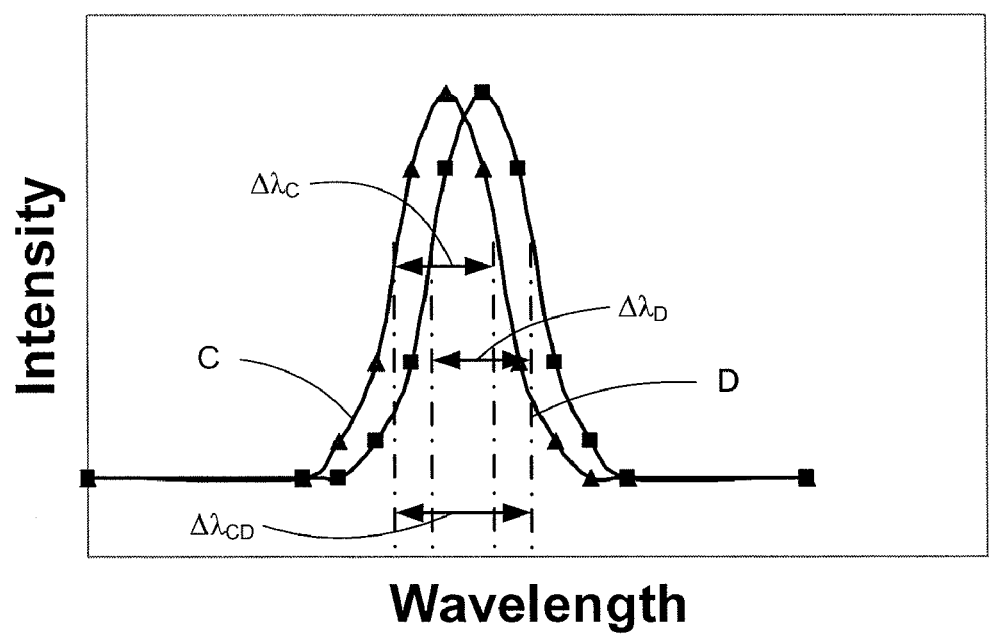

As shown in FIG. 3, in other embodiments, the spectrum defined by the spectral bandwidth $\Delta\lambda_C$ of optical energy C that passes through a first high-reflector grating can overlap with the spectrum defined by the spectral bandwidth $\Delta\lambda_D$ of optical energy D that passes through a second high-reflector grating. In such embodiments, the spectral bandwidth $\Delta\lambda_{CD}$ of the laser cavity is less than the sum of the two individual spectral bandwidths $\Delta\lambda_C$ and $\Delta\lambda_D$. In still other embodiments, the spectral bandwidth of the first high-reflector grating is not substantially equal to the spectral bandwidth of the second high-reflector grating, and the spectrum defined by the spectral bandwidth of the first high-reflector grating does not overlap the spectrum defined by the spectral bandwidth of the second high-reflector grating. In such embodiments, the spectral bandwidth of the first laser cavity can be represented by:

$$k=(\Delta\lambda_1+\ldots+\Delta\lambda_n),$$

where k is the spectral bandwidth of the first laser cavity, n is the number of high-reflector gratings in the first laser cavity (e.g., 2 high-reflector gratings in laser cavity 110) and $\Delta\lambda_1$ is the spectral bandwidth of the first high-reflector grating and $\Delta\lambda_n$ is the spectral bandwidth of the $n^{th}$ high-reflector grating (e.g., the second high-reflector grating in laser cavity 110). In other words, in such embodiments, the spectral bandwidth of the first laser cavity can be calculated by summing the spectral bandwidths of the high-reflector gratings.

Figure 4:
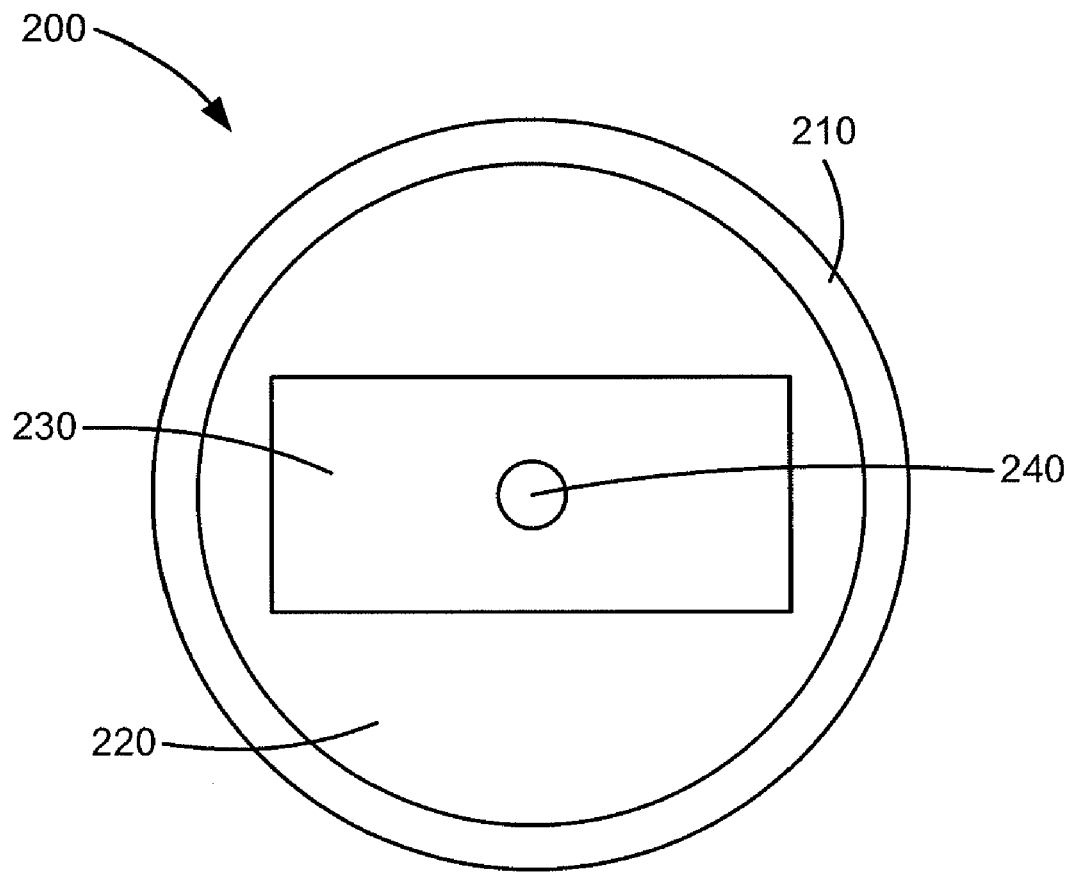
FIG. 4 is a cross-section of a polarization-maintaining doped double clad fiber, according to another embodiment.

The doped fiber 140 of the first laser cavity 110 is configured to amplify the intensity of the optical energy that passes through the doped fiber 140. In some embodiments, for example, the doped fiber 140 is a polarization-maintaining doped double clad fiber. FIG. 4 shows a cross-section of a polarization-maintaining doped double clad fiber 200. The fiber 200 includes a jacket 210, an outer cladding 220, an inner cladding 230 and a core 240. In such embodiments, the core 240 can be doped with rare-earth metals, such as, for example, erbium (Er), neodymium (Nd), ytterbium (Yb), thulium (Tm), and/or praseodymium (Pr), and/or ions of such rare-earth metals.

In such embodiments, optical energy within fiber 200 propagates within the core 240 of the fiber 200 and optical energy from the pump propagates within the core 240 and the inner cladding 230 of the fiber 200. The pump optical energy amplifies the optical energy within the core 240. In such embodiments, the optical energy within the core can be amplified such that kW power levels are produced when the optical energy is transmitted from a laser cavity, such as the first laser cavity 110.

To maintain polarization, the inner cladding 230 of fiber 200 may have a non-circular cross-section. While shown in FIG. 4 as having a cross-section with a rectangular inner cladding 230, in other embodiments, the inner cladding can have, for example, an elliptical cross-section, a triangular cross-section, and/or the like. In still other embodiments, the fiber can include rods of another material within the cladding having a panda, bow-tie, and/or other suitable configuration configured to maintain polarization of the optical energy within the fiber.

Returning to FIG. 1, the fiber coupler 190 couples the first laser cavity 110 with the second laser cavity 150. As further described herein, when the optical energy within the first laser cavity 110 reaches the second end 114 of the first laser cavity 110 (e.g., contacts the fiber coupler 190), a first portion of the optical energy is reflected back into the first laser cavity 110. Similarly, when the optical energy within the second laser cavity 150 reaches the second end 154 of the second laser cavity 110 (e.g., contacts the fiber coupler 190), a first portion of the optical energy is reflected back into the second laser cavity 150. A second portion of the optical energy within the first laser cavity 110 is combined with a second portion of the optical energy within the second laser cavity 150 at the fiber coupler 190 and is passed to the output fibers 195, as further described below. Specifically, the second portion of the optical energy within the first laser cavity 110 constructively interferes with the second portion of the optical energy within the second laser cavity 150 via spontaneous phase locking at the fiber coupler 190. This increases the intensity of the optical energy passed to the output fibers 195.

The coherent coupling efficiency of the fiber coupler 190 depends on the spectral bandwidth of the optical energy within each laser cavity (e.g., the first laser cavity 110 and the second laser cavity 150 in passive coherent array 100). Specifically, the coherent coupling efficiency can be estimated by the following equation:

$$R = 1 - \frac{\pi^2}{2}(kL)^{-2/(N-1)},$$

where k is the spectral bandwidth of the optical energy within each laser cavity, L is the fiber length of each laser cavity, and N is the number of laser cavities combined. Accordingly, when the spectral bandwidth of the optical energy within each laser cavity is increased, the coherent coupling efficiency of the fiber coupler 190 is increased.

In use, the pump 120 transmits optical energy into the first end 112 of the first laser cavity 110 in a direction shown by the arrow AA in FIG. 1. The optical energy passes through the first high-reflector grating 130 and the second high-reflector grating 132. Because the high-reflector gratings 130, 132 are directional, substantially no optical energy is reflected and substantially all of the optical energy provided by the pump 120 is passed through the high-reflector gratings 130, 132.

The optical energy then passes through the doped fiber 140 (in the direction of arrow AA). The doped fiber 140 amplifies the intensity of the optical energy. The optical energy then reaches the second end 114 of the first laser cavity 110 where a portion of the optical energy is reflected back through the first laser cavity 110 in a direction shown by the arrow BB in FIG. 1. The reflected optical energy passes once again through the doped fiber 140, amplifying the intensity of the optical energy. Another portion of the optical energy is combined with the optical energy within the second laser cavity 150 received at the fiber coupler 190 (e.g., in a similar manner as described for first laser cavity 110) and passed to the output fibers 195.

When the reflected optical energy (e.g., the portion of the optical energy reflected back through the first laser cavity 110 in the direction of arrow BB) reaches the second high-reflector grating 132, optical energy is reflected in the direction shown by the arrow AA in FIG. 1 based on the spectral response of the second high-reflector grating 132. The optical energy having other wavelengths pass through the second high-reflector grating 132 (e.g., in the direction of arrow BB).

Similarly, when the optical energy passed through the second high-reflector grating 132 reaches the first high-reflector grating 130, optical energy is reflected in the direction shown by the arrow AA in FIG. 1 based on the spectral response of the first high-reflector grating 130. The optical energy having other wavelengths is allowed to pass through the first high-reflector grating 130 and out of the first laser cavity 110 (in the direction of arrow BB). As described above, the effective spectral bandwidth $\Delta\lambda_{AB}$ of the optical energy within the first laser cavity 110 is the aggregation of the spectral bandwidth $\Delta\lambda_A$ of the optical energy reflected by the first high-reflector grating 130 and the spectral bandwidth $\Delta\lambda_B$ of the optical energy reflected by the second high-reflector grating 132 (in the direction of arrow AA).

The intensity of the reflected optical energy (the optical energy that has been reflected by high-reflector gratings 130, 132 in the direction of arrow AA is amplified as it passes through the doped fiber 140. The reflected optical energy that is moving in the direction shown by the arrow AA in FIG. 1 then reaches the second end 114 of the first laser cavity 110. Again, a portion of the optical energy is reflected back into the first laser cavity 110. Another portion of the optical energy is combined with optical energy within the second laser cavity 150 at the fiber coupler 190 via spontaneous phase locking. The optical energy within the second laser cavity 150 can be filtered and amplified similar to the optical energy within the first laser cavity 110. The combined optical energy can then be output to the output fibers 195. By combining the optical energy of the first laser cavity 110 and the second laser cavity 150, the intensity of the optical energy output to the output fibers 195 is greater than if either the optical energy of the first laser cavity 110 or the optical energy of the second laser cavity 150 were output alone. Additionally, as described above, by increasing the spectral bandwidth of the optical energy in both the first laser cavity 110 and the second laser cavity 150 by using multiple high-reflector gratings, the coherent beam combining efficiency is increased.

In some embodiments, the pump 120 and the pump 160 continuously pump optical energy into the first laser cavity 110 and the second laser cavity 150, respectively. Such pumping can be pulses of optical energy or a continuous wave of optical energy.

While the passive coherent array 100 is shown and described has having two laser cavities 110 and 150, in other embodiments, the passive coherent array can have any number of laser cavities. In some embodiments, for example, three or more laser cavities can be combined using a single fiber coupler.

Additionally, while each laser cavity 110, 150 is shown and described above as having two high-reflective gratings, any number of high-reflective gratings can be used. In some embodiments, for example, three or more high-reflective gratings are serially coupled together. This further increases the spectral bandwidth of the optical energy collectively reflected by the high-reflective gratings, further increasing the coherent beam combining efficiency at the fiber coupler.

Figure 5:
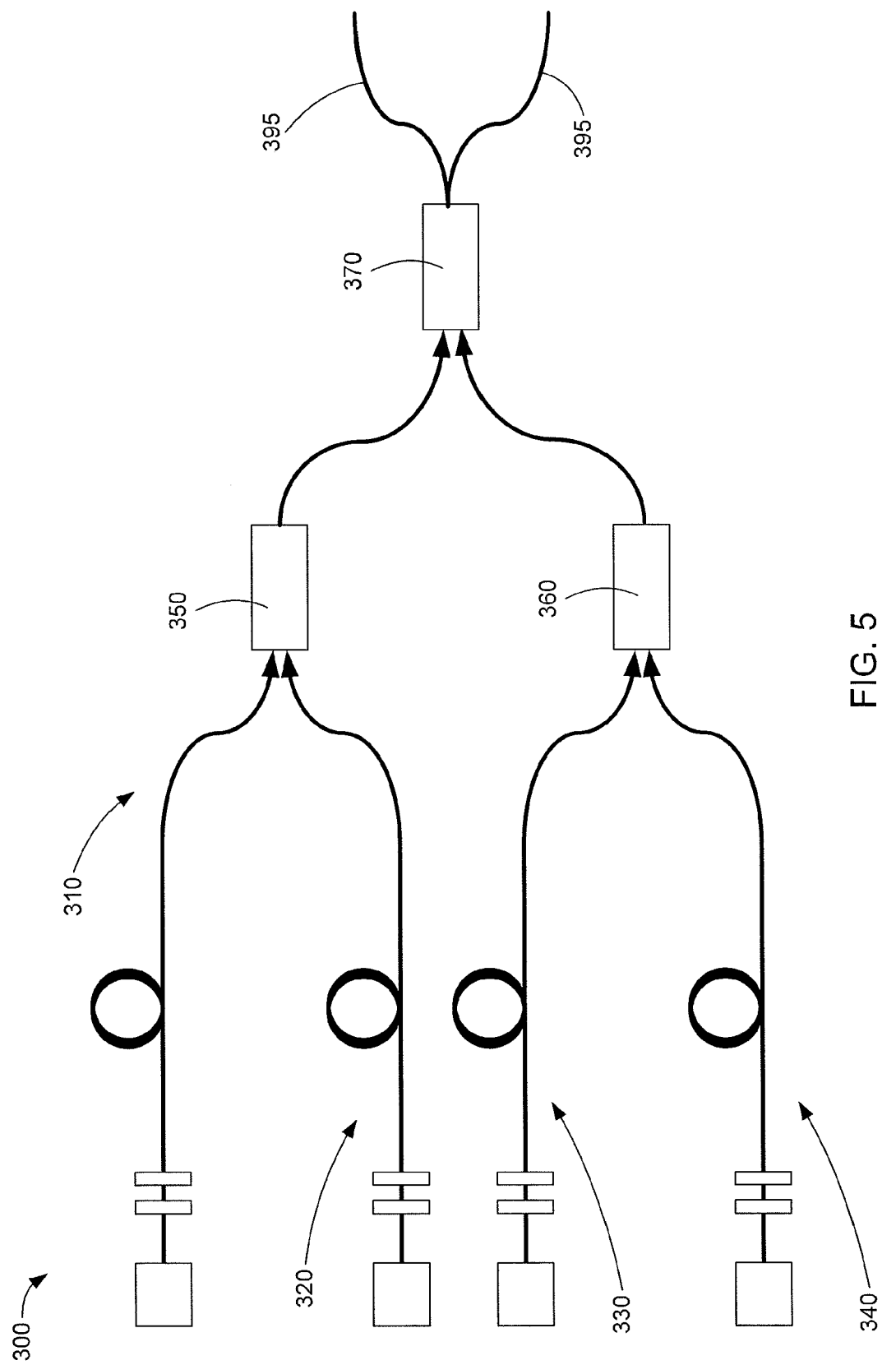
FIG. 5 is a schematic illustration of a passive coherent array, according to another embodiment.

In some embodiments, any number of fiber couplers can be used. FIG. 5, for example, shows a passive coherent array 300 with three fiber couplers 350, 360, and 370. Specifically, fiber coupler 350 couples laser cavity 310 with laser cavity 320, and fiber coupler 360 couples laser cavity 330 with laser cavity 340. Fiber coupler 370 couples the output of fiber coupler 350 with the output of fiber coupler 360. Output fibers 395 are coupled to the fiber coupler 370. In such an embodiment, the optical energy in laser cavity 310 can be combined with the optical energy in laser cavity 320 at fiber coupler 350, the optical energy in laser cavity 330 can be combined with the optical energy in laser cavity 340 at fiber coupler 360, and the combined optical energy of laser cavities 310 and 320 can be combined with the combined optical energy of laser cavities 330 and 340 at fiber coupler 370. The combined optical energy of the laser cavities 310, 320, 330, and 340 can then be output to the output fibers 395.

While the passive coherent arrays (e.g., 100, 300) are shown and described above as having two output fibers (e.g., 195, 395), any number of output fibers can be used. In some embodiments, for example, three or more output fibers are used.

Figure 6:
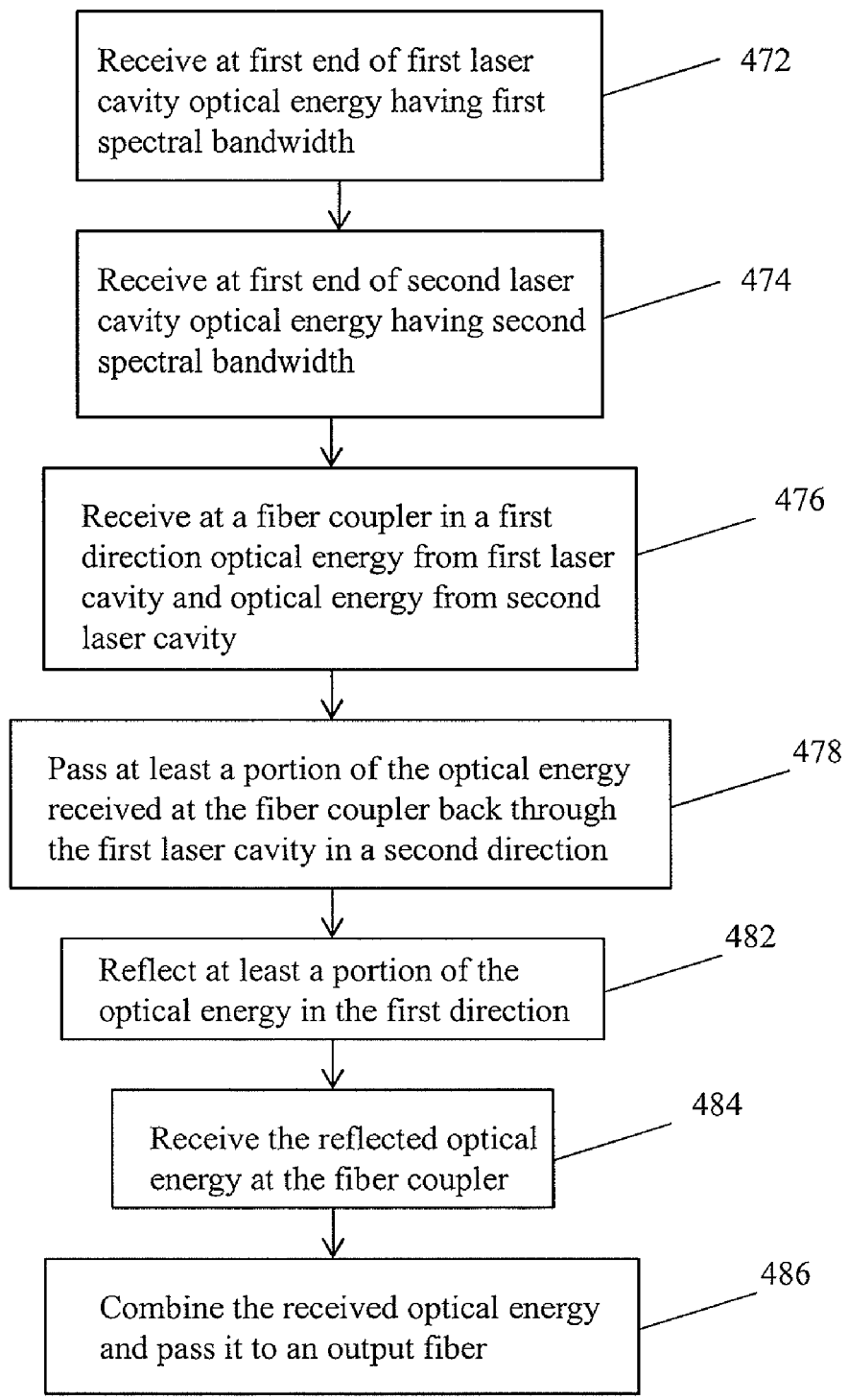
FIG. 6 is a flowchart illustrating a method of increasing a spectral bandwidth of a laser cavity system according to an embodiment.

FIG. 6 is a flowchart illustrating a method of increasing a spectral bandwidth of a laser cavity system according to an embodiment. The method includes at 472, receiving at a first end of a first laser cavity, optical energy having a first spectral bandwidth. As described herein, the first laser cavity can include, a first high-reflector grating and a second high-reflector grating coupled in series between the first end and a second end of the first laser cavity. At 474, at a first end of a second laser cavity, optical energy having a second spectral bandwidth is received. As with the first laser cavity, the second laser cavity can also include a first high-reflector grating and a second high-reflector grating coupled in series between the first end and a second end of the second laser cavity as described herein.

At 476, optical energy from the first laser cavity having a third spectral bandwidth greater than the first spectral bandwidth and optical energy from the second laser cavity having a fourth spectral bandwidth greater than the second spectral bandwidth is received at a fiber coupler. The fiber coupler can be coupled, for example, to the second end of the first laser cavity and to the second end of the second laser cavity.

For example, in some embodiments, substantially all of the optical energy received at the first end of the first laser cavity, which can be referred to as the first optical energy, can be passed in a first direction through the first high-reflector grating and through the second high-reflector grating of the first laser cavity to produce a second optical energy. Substantially all of the second optical energy can be passed through a doped fiber coupled in series to the first and second high-reflector gratings to produce a third optical energy that has an amplitude that is greater than the amplitude of the second optical energy. The optical energy from the first laser cavity having a third spectral bandwidth greater than the first spectral bandwidth is received at the fiber coupler. Similarly, substantially all of the optical energy received at the first end of the second laser cavity can be passed in the first direction through the second laser cavity in a similar manner and received at the fiber coupler having a fourth spectral bandwidth greater than the second spectral bandwidth.

At 478, at least a portion of the third optical energy can be passed back through the doped fiber of the first laser cavity in a second direction opposite the first direction to produce a fourth optical energy. At 482, a first portion of the fourth optical energy is reflected from the first high-reflector grating and a second portion of the fourth optical energy is reflected from the second high-reflector grating in the first direction to collectively produce a fifth optical energy. The fifth optical energy can have a third spectral bandwidth that is greater than the first spectral bandwidth. Similarly, at least a portion of the optical energy received at the fiber coupler from the second laser cavity can be passed back through the second laser cavity in a similar manner and reflected back through the second laser cavity in a similar manner.

At 484, reflected optical energy is received at the fiber coupler from the first laser cavity and from the second laser cavity. At 486, the fiber coupler combines the optical energy received from the first laser cavity and from the second laser cavity and passes the combined optical energy to one or more output fibers coupled to the fiber coupler. In some embodiments, the optical energy received from the first laser cavity and the optical energy received from the second laser cavity can be combined at the fiber coupler via phase locking.

Figure 7:
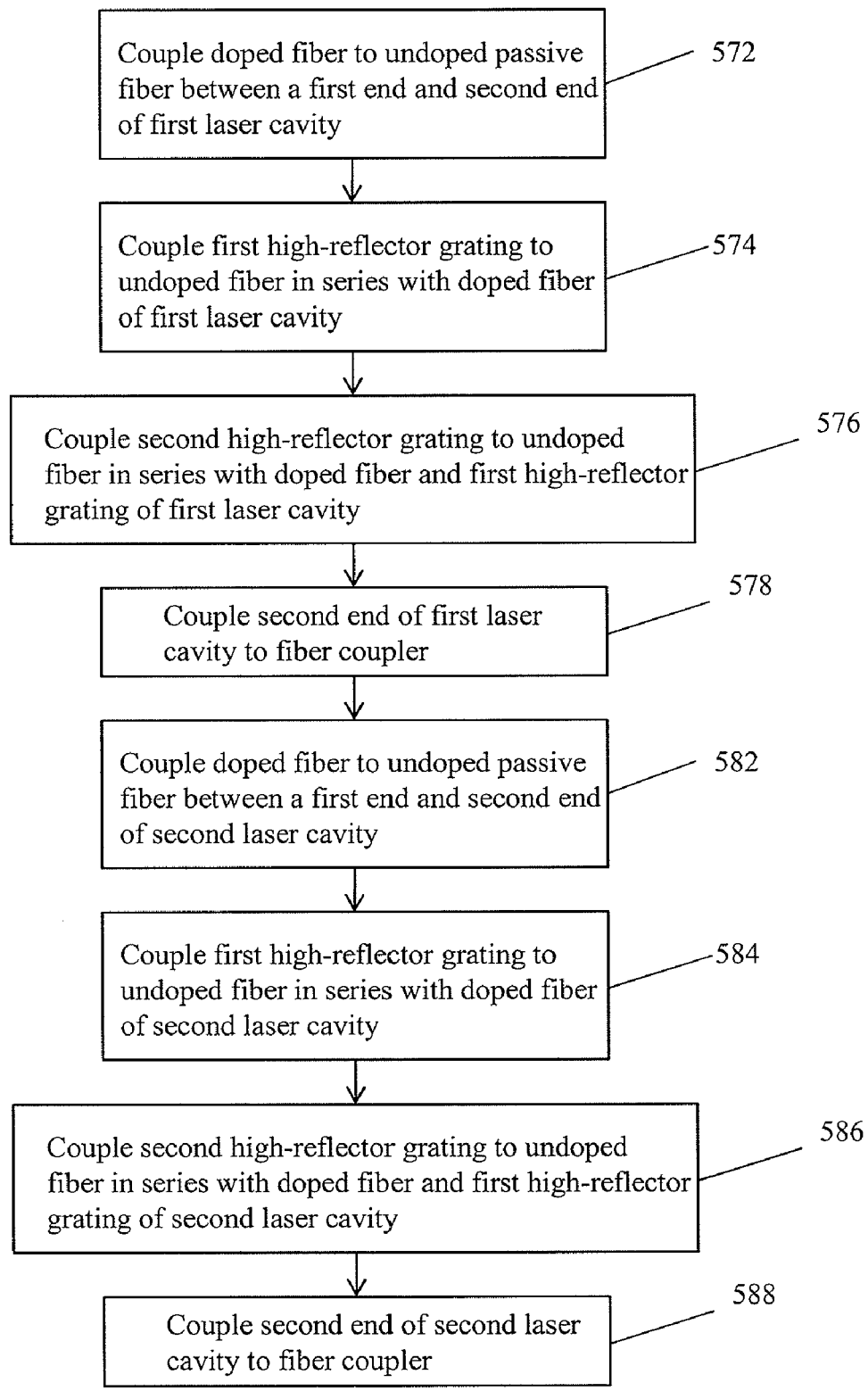
FIG. 7 is a flowchart illustrating a method of assembling a laser cavity system according to an embodiment.

FIG. 7 is a flowchart illustrating a method of assembling a laser cavity system according to an embodiment. The method includes at 572, coupling a doped fiber to an undoped passive fiber at a location between a first end and a second end of a first laser cavity. As described herein, the first end of the first laser cavity can be configured to receive from an energy source optical energy having a first spectral bandwidth. At 574, a first high-reflector grating is coupled to the undoped passive fiber in series with the doped fiber, between the doped fiber and the first end of the first laser cavity. At 576, a second high-reflector grating is coupled to the undoped passive fiber in series with the first high-reflector grating and the doped fiber, between the doped fiber and the first end of the first laser cavity. At 578, the second end of the first laser cavity is coupled to a fiber coupler configured to receive from the first laser cavity optical energy having a second spectral bandwidth greater than the first spectral bandwidth.

At 582, a doped fiber can be coupled to an undoped passive fiber of a second laser cavity at a location between a first end and a second end of a second laser cavity. The first end of the second laser cavity can be configured to receive from an energy source optical energy having a third spectral bandwidth. At 584, a first high-reflector grating can be coupled to the undoped passive fiber in series with the doped fiber of the second laser cavity, between the doped fiber and the first end of the second laser cavity. At 586, a second high-reflector grating can be coupled in series with the first high-reflector grating and the doped fiber, between the doped fiber and the first end of the second laser cavity. At 588, the second end of the second laser cavity can be coupled to the fiber coupler. The fiber coupler can be configured to combine the optical energy received from the first laser cavity with an optical energy received from the second laser cavity and pass the combined optical energy to one or more output fibers coupled to the fiber coupler.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

Although various embodiments have been described as having particular features and/or combinations of components, other embodiments are possible having a combination of any features and/or components from any of embodiments where appropriate.

What is claimed is:
1. A method, comprising:
receiving, at a first end of a first laser cavity, a first optical energy having a first spectral bandwidth, the first laser cavity including a first high-reflector grating and a second high-reflector grating coupled in series between the first end and a second end of the first laser cavity;
receiving, at a first end of a second laser cavity, optical energy having a second spectral bandwidth, the second laser cavity including a first high-reflector grating and a second high-reflector grating coupled in series between the first end and a second end of the second laser cavity;
receiving, at a fiber coupler, optical energy from the first laser cavity having a third spectral bandwidth greater than the first spectral bandwidth and optical energy from the second laser cavity having a fourth spectral bandwidth greater than the second spectral bandwidth;
passing in a first direction substantially all of the first optical energy through the first high-reflector grating and the second high-reflector grating of the first laser cavity to produce a second optical energy;
after the passing the first optical energy, passing in the first direction substantially all of the second optical energy through a doped fiber coupled in series with the first high-reflector grating and the second high-reflector grating of the first laser cavity to produce a third optical energy, the third optical energy having an amplitude greater than an amplitude of the second optical energy;

after the passing the second optical energy, receiving at least a portion of the third optical energy back through the doped fiber in a second direction opposite the first direction to produce a fourth optical energy; and receiving at the doped fiber a first portion of the fourth optical energy reflected from the first high-reflector grating of the first laser cavity and a second portion of the fourth optical energy reflected from the second high-reflector grating of the first laser cavity in the first direction to collectively produce a fifth optical energy, the fifth optical energy having the third spectral bandwidth greater than the first spectral bandwidth.

2. The method of claim 1, wherein
the second optical energy has an amplitude greater than an amplitude of the first optical energy.

3. The method of claim 1, further comprising:
at the fiber coupler, combining via phase locking the optical energy received from the first laser cavity and the optical energy received from the second laser cavity.

4. The method of claim 1, further comprising:
at the fiber coupler, combining via phase locking the optical energy received from the first laser cavity and the optical energy received from the second laser cavity to produce a combined optical energy; and passing the combined optical energy to an output fiber coupled to the fiber coupler.

* * * * *